United States Patent [19]

Lloyd

[11] Patent Number: 4,878,385
[45] Date of Patent: Nov. 7, 1989

[54] DIFFERENTIAL PRESSURE SENSING APPARATUS

[75] Inventor: Sheldon G. Lloyd, Austin, Tex.

[73] Assignee: Fisher Controls International, Inc., Austin, Tex.

[21] Appl. No.: 151,557

[22] Filed: Feb. 2, 1988

[51] Int. Cl.$^4$ .......................... G01L 7/08; G01L 9/00
[52] U.S. Cl. ...................................... 73/704; 73/720; 310/324; 310/338
[58] Field of Search ............... 73/704, 702, 717, 720, 73/723, 754; 310/321, 323, 338, 324

[56] References Cited

U.S. PATENT DOCUMENTS

| | | | |
|---|---|---|---|
| 3,343,420 | 9/1967 | Kondo et al. ........................ | 73/720 |
| 4,212,209 | 7/1980 | Newbold et al. ..................... | 73/721 |
| 4,215,570 | 8/1980 | EerNisse ............................ | 73/141 R |
| 4,372,173 | 2/1983 | EerNisse et al. .................... | 73/862.59 |
| 4,382,385 | 5/1983 | Paros .................................. | 73/702 |
| 4,479,070 | 10/1984 | Frische et al. ....................... | 310/338 |
| 4,479,391 | 10/1984 | Banik et al. ........................ | 73/862.59 |
| 4,594,898 | 6/1986 | Kirman et al. ...................... | 73/778 |
| 4,669,316 | 6/1987 | Olsen et al. ........................ | 73/702 |

Primary Examiner—Donald O. Woodiel
Attorney, Agent, or Firm—Arnold, White & Durkee

[57] ABSTRACT

An apparatus for sensing differential pressures is provided. The apparatus includes a housing having an inner chamber filled with an incompressible working fluid. First and second diaphragms are provided in said housing for interacting with the fluids being measured. A flex-tube is provided in the housing and is coupled to one of the diaphragms for sensing the differential pressure. One end of the flex-tube is securely mounted to the housing and the other end is coupled to the diaphragm. A quartz sensor is positioned on the core for sensing strain applied to the flex-tube by the differential pressure exerted on the diaphragm.

24 Claims, 3 Drawing Sheets

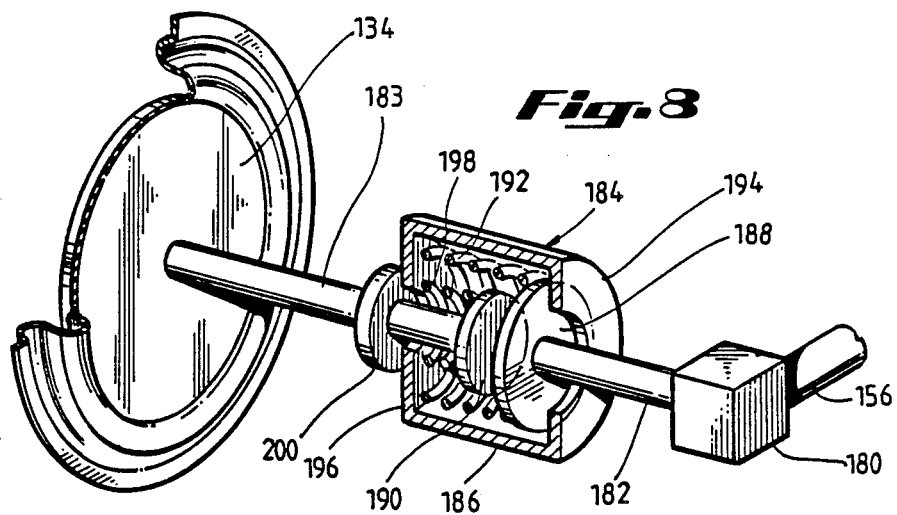
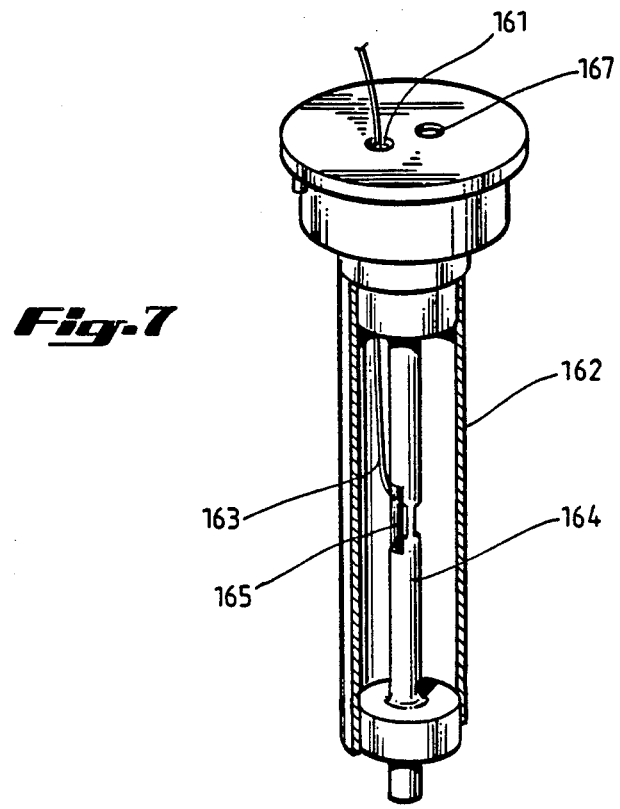

DIFFERENTIAL PRESSURE SENSING APPARATUS

BACKGROUND OF THE INVENTION

The present invention relates generally to apparatus for sensing and measuring pressures and more particularly to apparatus for sensing and measuring the differential between two fluid pressures.

Differential pressure sensing devices have many applications, but they are especially useful in the control of industrial processes. For example, they can be used to determine the gauge pressure of a fluid by referencing the pressure of the fluid against atmospheric pressure, to determine the absolute pressure of the fluid by referencing the fluid's pressure to a vacuum or absolute zero pressure, or to obtain the liquid head of the contained liquid by sensing the pressures above and below the surface of the liquid. Another application of such devices is to inferentially determine the rate, volume and/or mass of a fluid flowing in a line. Typically, this is accomplished by measuring the differential pressure of the fluid on opposite sides of a metering restriction, such as an orifice plate in the line, and then electronically processing the differential pressure measurement to determine flow rate, volume and/or mass of the fluid.

Numerous types of devices have been developed and commercialized for these purposes. One such type of device utilizes a differential pressure cell having two opposing diaphragms which interact with the fluids and respond to the fluid pressures being measured, and includes means for measuring the difference in pressure applied to the two diaphragms. One particular device of this type incorporates a third diaphragm which is positioned between the other two and which, in response to a differential pressure, is displaced towards the lower pressure. This diaphragm acts with other sensors within the cell to create a difference in capacitance which can be related to the differential pressure.

The use of a vibratory piezoelectric element, such as a quartz crystal to measure different parameters such as pressure is also known. An example of this technology is disclosed in U.S. Pat. No. 4,526,480, issued to Ward. The use of piezoelectric elements provides several advantages, but particularly increased sensitivity, resolution and stability as compared to other prior art devices. Accordingly, it would be a significant advancement in the art to provide a differential pressure sensing apparatus utilizing a vibratory, piezoelectric element to provide high sensitivity, resolution and stability at a relatively low cost. It would be a further significant advancement if such an apparatus was not responsive to the common mode value of the two pressures differenced and was not sensitive to changes in temperature which could give erroneous readings. Such an apparatus is disclosed and claimed herein.

SUMMARY OF THE INVENTION

The present invention provides a unique differential pressure sensing apparatus which provides excellent sensitivity to and resolution of differential pressures and which is stable with respect to temperature changes.

The apparatus comprises a core having a relatively flexible intermediate section. A means is provided for applying a differential pressure to the core causing it to flex. A piezoelectric sensor is mounted on the core and generates a signal in response to the flexing of the core caused by the differential pressure.

In a preferred embodiment, the apparatus comprises a housing having an inner chamber filled with a substantially incompressible fluid. A first diaphragm is positioned in said housing for separating a first fluid being measured from the inner chamber. A second diaphragm is also provided in the housing on a side opposite said first diaphragm for separating a second fluid from the inner chamber. The housing and the outer surfaces of the diaphragms can be connected by any suitable method to the first and second fluids being tested.

A mechanism is provided in the inner chamber of the housing for sensing the differential pressure between the fluid pressures applied to the first and second diaphragms. In a preferred embodiment, the mechanism comprises a flex-tube which includes a tubular member having a circular cross-section which is rigidly secured at one end to the housing. A core having a relatively flexible intermediate section is sealed within the tubular member. The core also has a first end rigidly secured to the housing member. In the preferred embodiment, the tubular member is evacuated after the core is in place. However, in alternative embodiments, the tubular member can also be filled with gas, preferably inert, to prevent detrimental reactions with the components of the device.

The free end of the tubular member and core are coupled to the first diaphragm such that as the diaphragm moves in response to the differential pressure between it and the second diaphragm, it creates a force on the tubular member and core causing them to bend slightly. In a preferred embodiment, the differential pressure sensing apparatus is designed such that the higher pressure is always applied to the first diaphragm. In this embodiment, a push rod secured at one end to the diaphragm pushes against the free end of the tubular member. In a second embodiment, the free end of the tubular member and core are connected by a mechanical linkage to the first diaphragm such that the tubular member and core can bend in either direction depending upon the direction in which the differential pressure is acting upon the diaphragms.

A strain gauge is mounted on the core adjacent to the flexible intermediate section for sensing any strain placed on the core by the diaphragm. The strain gauge is connected by suitable leads to a monitoring apparatus.

In a preferred embodiment, the strain gauge is a vibratory, piezoelectric element made, for example from quartz. Suitable electrodes and electronics are provided for causing the beam of the element to vibrate at a resonant frequency. As strain is applied to the core and thus to the piezoelectric element, the frequency of the element's vibrating beam structure changes. This change can be correlated to the differential pressure. In the preferred embodiment, two quartz devices are mounted on opposite sides of the core. By using two piezoelectric elements, any changes in frequency due to temperature variations are cancelled out.

It can readily be seen that the present invention provides a differential pressure sensing apparatus which has several advantages over the prior art. One major advantage is that by using a quartz crystal, high sensitivity, resolution and stability can be achieved at a relatively low cost. Since the sensor is a resonant device, the sensor frequency is readily digitized by counting, thus eliminating the usual analog-to-digital conversion circuitry used in other types of devices. A further advantage of the invention is that the sensing apparatus is relatively insensitive to changes in temperature and other ambient conditions. Additional advantages will become, apparent from the following detailed description and appended claims.

BRIEF DESCRIPTION OF THE DRAWINGS

FIG. 7 is an enlarged perspective view of a portion of the apparatus of FIG. 6.

FIG. 8 is a perspective view shown partially in cross-section to illustrate a break away linkage in the embodiment of FIG. 6.

DETAILED DESCRIPTION OF THE PREFERRED EMBODIMENTS

The present invention provides a differential pressure sensing apparatus which utilizes a strain sensor such as a vibratory, piezoelectric element comprising, for example, a quartz beam structure to measure the differential pressure between two fluid pressures. The invention is best understood by reference to the attached drawings in which like parts are designated with like numerals throughout.

Figure 1:
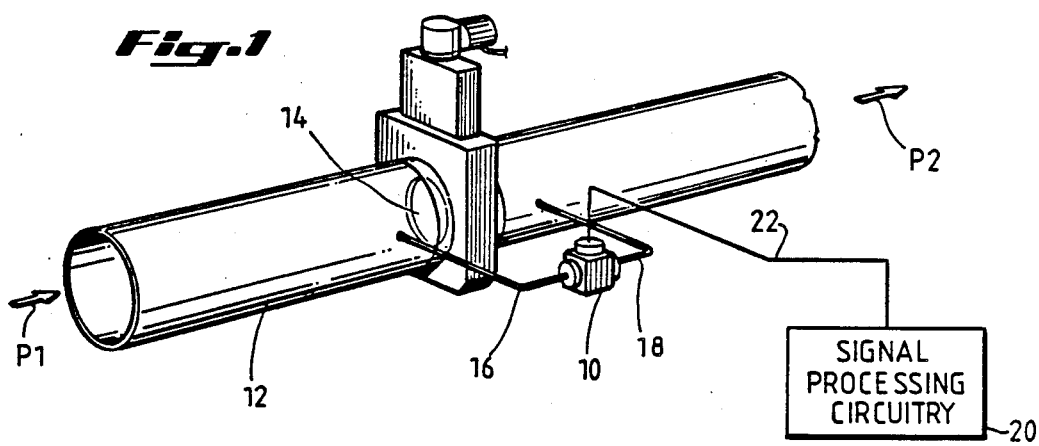
FIG. 1 is a perspective view of the apparatus of the present invention connected to a pipe having an orifice plate.

Reference is first made to FIG. 1 which illustrates a differential pressure cell 10 of the apparatus connected to a pipe 12 having an orifice plate 14 for obtaining an inferred flow indication, the direction of fluid flow through pipe 12 being indicated by the arrows in FIG. 1. Cell 10 is connected by fluid lines 16 and 18 to pipe 12, with line 16 being connected upstream of orifice plate 14 and line 18 connected downstream of orifice plate 14. Accordingly, the differential pressure developed across orifice plate 14 is coupled to pressure cell 10 via lines 16 and 18 with line 16 providing the higher pressure. The differential pressure is converted by pressure cell 10 to a digital, electronic signal representative of the differential pressure.

Pressure cell 10 is connected to signal processing circuitry 20 by an electrical cable 22. Control module 20 controls the operation of cell 10 as described more fully below and records or displays the differential pressure.

Figure 2:
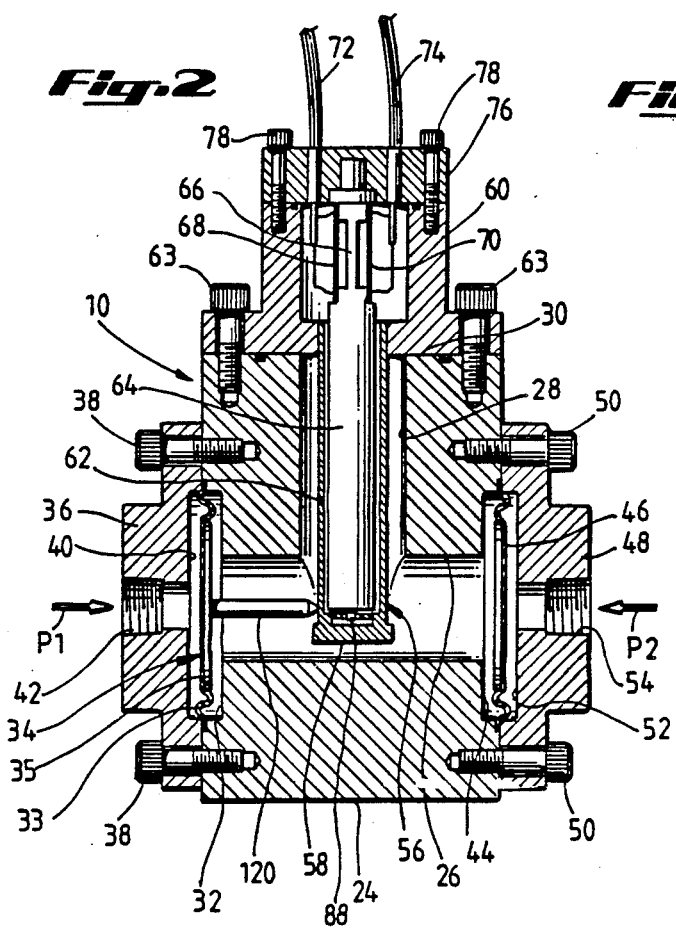
FIG. 2 is a cross-sectional view of a preferred embodiment of the present invention.

Reference is next made to FIG. 2 which illustrates a preferred embodiment of pressure cell 10. In this embodiment, cell 10 comprises a housing 24 having a cylindrical channel 26 extending therethrough and a second cylindrical channel 28 extending from channel 26 through the top 30 of the housing. Channels 26 and 28 thus form an inner chamber within housing 24.

A recess 32 is formed in housing 24 such that it is coaxially aligned with one end of channel 26. A diaphragm assembly 34 is clamped or seal-welded to housing 24 and covers recess 32. Recess 32 is designed to allow a small amount of diaphragm displacement but is configured to provide a travel stop and support against any overly high external pressure that may be applied. The diaphragm and the base of recess 22 are conformed such that they mate when diaphragm 34 is forced against recess 32 to provide an evenly distributed mechanical support. In the illustrated embodiment, diaphragm assembly 34 comprises a flexible diaphragm 35 and an inflexible diaphragm plate 33. It will of course be realized that other types of diaphragm assemblies can also be used. A cover 36 is fastened to housing 24 to cover diaphragm 34 and is secured in place by bolts 38. A recess 40 is formed in cover 36 adjacent diaphragm 34 such that diaphragm 34 is free to flex within the cavity defined by the recesses in cover 36 and housing 24. A threaded port 42 is provided in cover 36 so that cell 10 can be coupled to line 16 of FIG. 1.

Similarly, a recess 44 is also provided in the opposite side of housing 24 in coaxial alignment with channel 26. A diaphragm assembly 46, similar but not necessarily identical to diaphragm assembly 33, is mounted on housing 24 to cover recess 44. A cover 48, secured by bolts 50 to housing 24 adjacent diaphragm assembly 46 provides a recess 52 to allow diaphragm assembly 46 to flex within the recesses. A port 54 is also provided in cover 48 to allow cell 10 to be connected to line 18 in FIG. 1.

Channels 26 and 28 are filled with a substantially incompressible hydraulic fluid, and a sensing flex-tube 56 for determining the differential pressure is positioned axially within channel 28 such that its free end 58 extends into channel 26. The other end of flex-tube 56 is securely fastened in a cover 60 which closes channel 28 and is secured to housing 24 by bolts 63. Flex-tube 56 is formed from a cylindrical tube 62 and a core 64 which is sealed within tube 62. A small space is radially provided between tube 62 and core 64 to permit expansion and contraction of the parts without mechanical interference. Tube 62 and core 64 are preferably made of metal. In the preferred embodiment, core 64 has a circular cross-section, is axially positioned within tube 62 and includes a relatively flexible intermediate section 66 adjacent its anchored end. A push rod 120 is mounted on diaphragm 34 and engages the free end 58 of flex-tube 56 to cause the tube to flex in response to differential pressures exerted on diaphragm 34.

Strain sensors 68 and 70 are mounted on core 64 on opposite sides of flexible intermediate section 66 such that they are parallel to diaphragms 34 and 46. Core 64 can be aligned with housing 24 to ensure that the sensors are parallel to the diaphragms by any suitable method such as a flattened surface, key and slot, etc. Sensors 68 and 70 are connected to signal processing circuitry 20 by means of suitable leads 72 and 74 which extend through cap 76 of cover 60. Cap 76 is secured to cover 60 by bolts 78.

In the preferred embodiment the interior of cover 60 is substantially evacuated as is the space between core 64 and tube 62. However, it will be appreciated that under appropriate circumstances, the interior could be filled with a clean, dry gas which is inert with respect to the internal materials to prevent corrosion.

Figure 3:
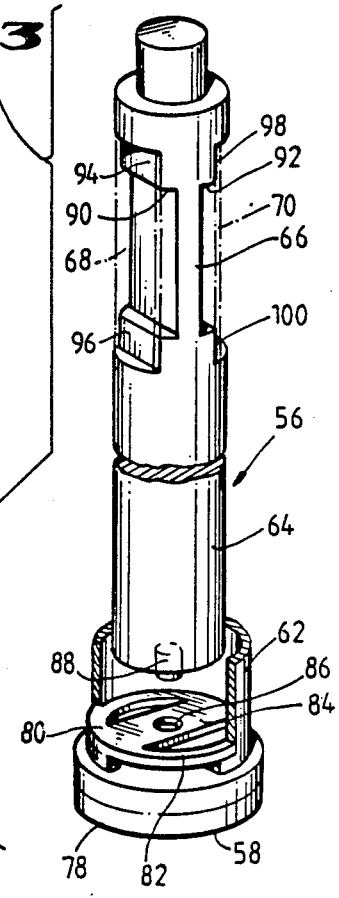
FIG. 3 is an exploded perspective view of a portion of the apparatus of FIG. 2.

FIG. 3 illustrates flex-tube 56 in greater detail. More particularly, it is seen that a plug 78 closes the free end 58 of flex-tube 56, plug 78 fitting snugly within the end of tube 62 and being sealed to tube 62 by welding or other suitable means.

A flexible coupling 80 connects the end of core 64 and the end of tube 62. In the illustrated embodiment, the flexible coupling comprises a ring 82 having a flexible web 84 extending across the center of the ring. A small hole 86 is formed in the center of web 84 and a peg 88, formed on the end of core 64, is snugly positioned within hole 86. Because web 84 is somewhat flexible in the axial direction, flexible coupling 80 allows core 64 to freely move axially with respect to tube 62 to compensate for any thermal expansion or contraction of tube 62 and core 64. However, because web 84 is relatively stiff with respect to transverse forces, any radial movement of tube 62 is accompanied by a corresponding movement of core 64.

Flexible intermediate section 66 of core 64 is created by forming notches 90 and 92 in core 64. Flattened surfaces 94 and 96 are formed on either side of notch 90 to facilitate mounting of strain sensor 68 which is shown in phantom lines in FIG. 3. Sensor 68 can be attached by any of several well known techniques including by adhesives. Similar flattened surfaces 98 and 100 are formed adjacent the ends of notch 92 for mounting sensor 70.

Figure 4:
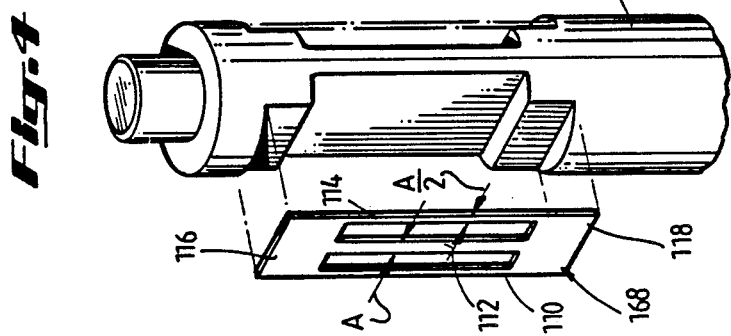
FIG. 4 is an exploded perspective view of a first preferred embodiment of the strain gauge portion of the present invention.
Figure 5:
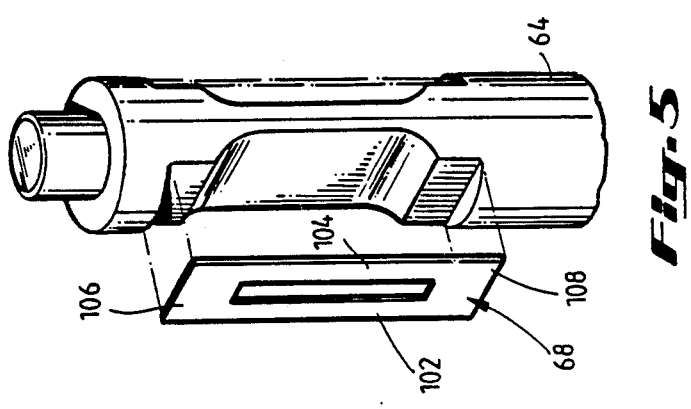
FIG. 5 is an exploded perspective view of a second preferred embodiment of the strain gauge portion of the present invention.

Reference is next made to FIGS. 4 and 5 to illustrate two preferred embodiments of strain sensors which can be used in the present invention.

FIG. 4 illustrates a preferred embodiment of a strain sensor 168 formed from a suitable piezoelectric material such as quartz. Strain sensor 168 is referred to as a tri-bar vibrating beam force sensor and includes three bars 110, 112, and 114 which are integrally formed with end plates 116 and 118. A suitable electrode pattern is provided on sensor 168 and coupled to leads 72 so as to cause the bars 110, 112 and 114 to vibrate at a characteristic resonant frequency when driven by an appropriate oscillator circuit, as in signal processing circuitry 20. In the preferred embodiment, bars 110, 112 and 114 vibrate in the flexural mode with bar 112 being 180° out of phase with bars 110 and 114 which vibrate in unison, all members vibrate in the direction normal to the plane of the sensor. Sensor 168 can also be vibrated in other modes such as the torsional mode. Further details of a tri-bar vibrating beam force sensor can be obtained by reference to U.S. Pat. No. 4,594,898 which is incorporated herein by reference.

In an alternative embodiment shown in FIG. 5, strain sensor 68 is formed as a double ended tuning fork. In this embodiment, sensor 68 has two bars 102 and 104 which are integrally connected to end plates 106 and 108. Sensor 68 is also formed from a suitable piezoelectric material such as quartz and an appropriate electrode pattern. In the preferred embodiment, sensor 68 is vibrated in the flexural mode where the bars 102 and 104 oscillate 180° out of phase in the plane of the sensor. However, sensor 68 can also be vibrated in other modes such as the torsional mode. Additional information concerning the structure and operation of suitable devices can be obtained by reference to U.S. Pat. Nos. 4,215,570; 4,372,173; and 4,479,070 which are incorporated herein by reference.

It will be appreciated that materials other than quartz can also be used for sensors 68 or 168, provided that those materials are piezoelectric or can be suitably interfaced electromagnetically, optically or by other means.

Referring again to FIG. 2, the operation of cell 10 will be described in greater detail. The inner chamber which is formed by channels 26 and 28 in housing 24 is filled with a substantially incompressible hydraulic fluid through a suitable filling hole. The space around core 64 in tube 62 of flex-tube 56 is substantially evacuated in the preferred embodiment. However, it can also be filled with a nonreactive, inert gas in appropriate circumstances.

In operation, port 42 of cover 36 is connected by line 16 to the fluid on the upstream side of orifice plate 14 where it has a pressure P1. Port 54 is connected by line 18 to the fluid on the downstream side of orifice plate 14 where the fluid has a pressure P2 whose differential with respect to P1 is to be determined. In the particular embodiment of FIG. 2, P1 must be the larger of the two pressures.

Diaphragm 46 is designed to be highly compliant, that is, incapable of supporting a differential pressure within its normal displacement range. In other words, diaphragm 46 will move when any differential pressure is applied to it until the pressure is balanced or the diaphragm engages recess 44. Diaphragm 46 therefore serves to transfer the external pressure, P2, to the hydraulically filled inner chamber formed by channels 26 and 28. Accordingly, the pressure in the inner chamber is equal to the pressure P2. The differential pressure, which is equal to P1 minus P2, is therefore applied across diaphragm 34 which is similarly compliant as diaphragm 46. To support the force resulting from the differential pressure being applied to the area of diaphragm 34, the force is transferred to flex-tube 56 by means of a push rod 120.

Although the flex-tube 56 is designed to support such forces within the measurement range, it nevertheless undergoes some degree of microstrain. As a result of this bending load which causes core 64 to flex, sensor 68 will be put in tension and sensor 70 will be put in compression, yielding a differential strain signal indicative of the applied differential pressure. The strain is manifested as a change in the resonant frequencies of the sensors which is measured by the signal processing circuitry 20 (see FIG. 1).

With regard to the ability of cell 10 to discriminate against unwanted influences, the following characteristics should be considered. Pressure $P_1$ may be thought of as consisting of two component values, one being the differential pressure to be sensed, the other being that pressure which is common to both sides of cell 10, i.e., $P_2$, often referred to as the common mode pressure. As described previously, the internal pressure in channel 26 is essentially identical to $P_2$, due to compliance of diaphragm 46. The common mode pressure thus appears on both sides of diaphragm 34 and exerts no net effect, leaving only the differential pressure to act on the diaphragm and ultimately the flex-tube 56. Variations in the hydraulic pressure in channel 26 have no influence on flex-tube bending. Due to the circular cross-section of flex-tube 56, and its straight longitudinal geometry, flex-tube 56 has no tendency to flex or bend as a result of pressure applied to its exterior, or to any pressure difference between its interior and exterior surfaces, no matter how that difference may arise. It is apparent that the flex-tube 56 will expand or contract, both axially and radially, as a result of changes in the internal and external pressure difference, and to changes in the device temperature. However, because of symmetry about the axis of the core member, such changes will induce equal amounts of strain in the sensor pair 68 and 70. The difference in strain measurements, or differential strain, will thus be zero for any of these influences. Variations in device temperature will also not have an effect on the differential strain signal of flex-tube 56. Temperature changes will cause expansion and contraction of the hydraulic working fluid in channels 26 and 28. However, changes in fluid volume merely cause compliant diaphragm 46 to become displaced to a position which accommodates the new fluid volume. Similarly, dimensional changes in the push rod 120 and housing 24 and other parts merely cause an accommodating displacement of compliant diaphragm 34.

Figure 6:
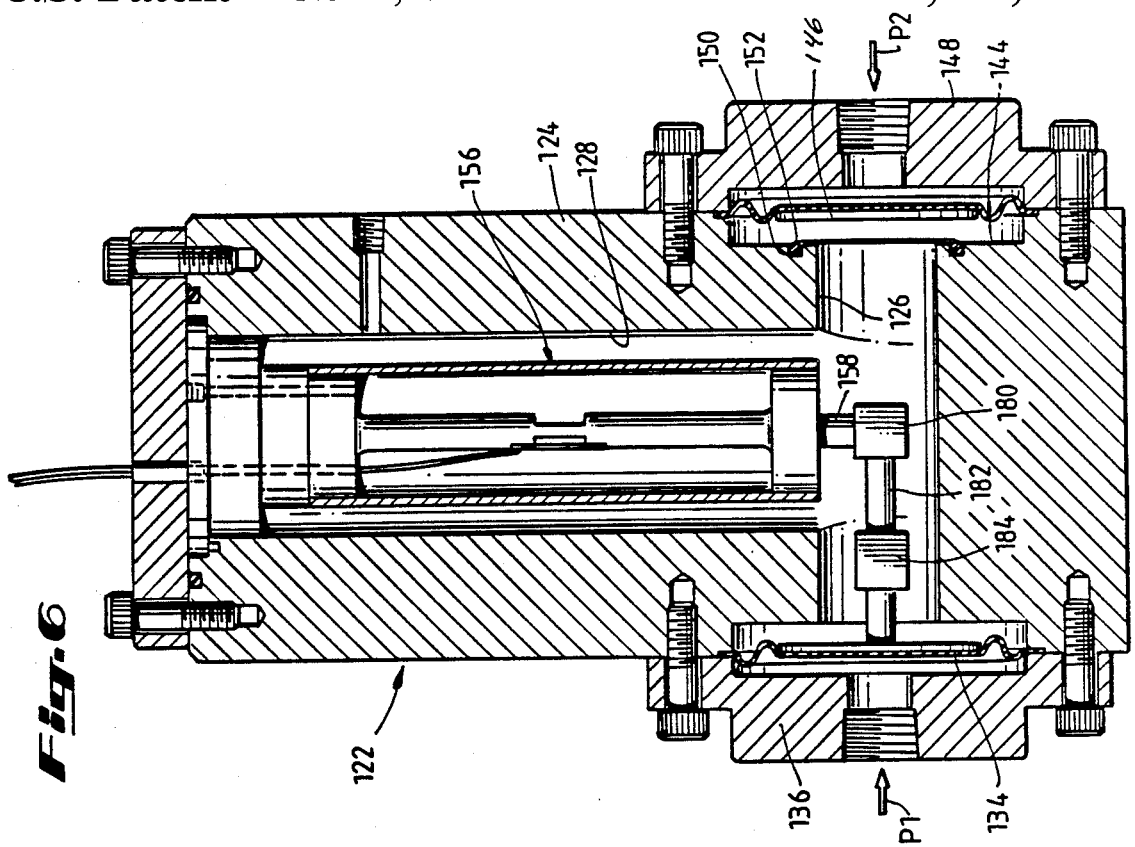
FIG. 6 is a cross-sectional view of a second preferred embodiment of the present invention.

Reference is next made to FIGS. 6–8 which illustrate a second preferred embodiment of the present invention. Cell 122 is formed from a housing 124 having channels 126 and 128 formed therein. Channels 126 and 128 form an inner chamber which is filled with a substantially incompressible hydraulic fluid. A diaphragm 134 is mounted above one end of channel 126 and is covered by a cover 136. A similar diaphragm 146 is positioned over the opposite end of channel 126 and is covered by a cover 148.

A recess 144 is formed in housing 124 adjacent diaphragm 146. Recess 144 allows a small amount of diaphragm displacement, but is configured to provide a travel stop and support against any high external pressure that may be applied to diaphragm 146 as discussed above with respect to diaphragm 34. An alternative method of supporting diaphragm 146 is illustrated in FIG. 6. An annular ring 150 is formed in housing 124 around channel 126, and a seal 152 is placed in annular ring 150. After the allowable diaphragm displacement has occurred, diaphragm 146 engages seal 152, trapping fluid between the diaphragm and housing 124. The trapped fluid provides hydraulic support against any additional external pressure to prevent rupture of or damage to the diaphragm.

Reference is next made to FIG. 7 which illustrates flex-tube 156 in greater detail. Flex-tube 156 includes a core 164 which is partially surrounded by a tube 162. Tube 162 is attached to core 164 by any of several suitable processes such as welding, brazing, soldering, or with adhesives such that a pressure tight seal is formed. In this embodiment, it is important that the tube and core materials be selected so as to have similar coefficients of thermal expansion since they are rigidly attached to each other. A hole 161 is provided in the end of core 164 to permit passage of leads 163 which are fastened to strain sensor 165 mounted on core 164. A pressure tight seal is formed by suitable means in hole 161 around leads 163. A second hole 167 is also formed in the end of core 164 to permit evacuation of the space between tube 162 and core 164.

In the illustrated embodiment, only a single sensor 165 is mounted on core 164. A microprocessor can be used to compensate for any temperature or environmental changes or any nonlinearity of the sensor. It should also be appreciated that other arrangements of sensors can also be used in the invention. However, two sensors positioned on opposite sides of the core is the preferred embodiment because it provides a simple means for cancelling out unwanted forces.

Referring again to FIG. 6, the free end 158 of flex-tube 156 is connected by a connector 180 to a push rod 182 which is mounted on the center of diaphragm 134. A break away mechanism 184 is provided in push rod 182 to prevent excessive forces from being applied to flex-tube 156. This embodiment permits the higher of the pressures being measured to be applied to either side of cell 122.

As illustrated in greater detail in FIG. 8, break away mechanism 184 comprises a housing 186 which encloses a pair of disks 188 and 190. Disk 188 is connected to the portion of push rod 182 which is fastened to connector 180. A spring 192 forces disk 188 against end 194 of housing 186. Disk 190, coupled to diaphragm 134 is pushed away from end 196 of housing 186 by a spring 198. A circular disk 200 is mounted on push bar 183 outside end 196 of housing 186. When an excessive pressure is placed on diaphragm 134 in the direction of flex-tube 156, the bias of spring 192 is overcome allowing disk 188 to collapse within break away mechanism 184. This prevents excessive forces from being applied to flex-tube 156. If excessive pressures are applied to diaphragm 134 in the direction away from flex-tube 156, the bias of spring of 198 is overcome allowing piston 190 to collapse so as to protect flex-tube 156. When the excessive pressure is released, break away mechanism 184 resumes its normal operating position.

As can be seen from the foregoing, the present invention provides a unique apparatus for sensing differential pressures. While the invention has been described with respect to the presently preferred embodiments, it will be appreciated by those skilled in the art that numerous changes and modifications can be made to the invention without the departing from the scope of the invention. For example, different types of diaphragm mechanisms, flex-tube configurations, and strain sensors could be used. Accordingly, the scope of the invention is indicated by the appended claims rather than by the foregoing description. All changes or modifications which come within the spirit and scope of the claims are to be embraced within their scope.

What is claimed is:

1. An apparatus for sensing differential pressures comprising:
    a core having a relatively flexible intermediate section, wherein said core is axially mounted within a cylindrical tube which flexes with said core;
    means for applying a differential pressure to said core causing it to flex in response to said differential pressure; and
    a piezoelectric sensor mounted on said core for generating a signal in response to flexing of the core in response to a differential pressure.

2. An apparatus for sensing differential pressures as defined in claim 1 wherein said piezoelectric sensor is made of quartz.

3. An apparatus for sensing differential pressures as defined in claim 1 wherein said piezoelectric sensor is a quartz beam structure.

4. An apparatus for sensing differential pressures as defined in claim 3 wherein said quartz beam structure is a tri-bar vibrating beam force sensor.

5. An apparatus for sensing differential pressures as defined in claim 4 wherein said tri-bar vibrating beam force sensor is vibrated in the flexural mode.

6. An apparatus for sensing differential pressures as defined in claim 4 wherein said tri-bar vibrating beam force sensor is vibrated in the torsional mode.

7. An apparatus for sensing differential pressures as defined in claim 3 wherein said quartz beam structure is a double ended tuning fork.

8. An apparatus for sensing differential pressures as defined in claim 7 wherein said double ended tuning fork is vibrated in the flexural mode.

9. An apparatus for sensing differential pressures as defined in claim 7 wherein said double ended tuning fork is vibrated in the torsional mode.

10. An apparatus for sensing differential pressures as defined in claim 1 further comprising a second piezoelectric sensor mounted on said core on a side opposite the piezoelectric sensor.

11. An apparatus for sensing differential pressures as defined in claim 1 wherein said core has a circular cross-section.

12. An apparatus for sensing differential pressures as defined in claim 1 wherein said means for applying differential pressure comprises:
a housing having an inner chamber filled with a substantially incompressible working fluid;
a first diaphragm in said housing for separating a fluid having a first pressure from said inner chamber;
a second diaphragm in said housing for separating a fluid having a second pressure from said inner chamber, the difference between said first and second pressures equaling the differential pressure; and
means for coupling said first diaphragm to said core.

13. An apparatus for sensing differential pressures as defined in claim 12 wherein said means for coupling comprises a push bar mounted on said first diaphragm which engages said core.

14.. An apparatus for sensing differential pressures as defined in claim 12 wherein said means for coupling comprises a push rod connected to said first diaphragm and said core.

15. An apparatus for sensing differential pressures as defined in claim 14 wherein said push rod comprises means for preventing excessive pressures from being applied to said core.

16. An apparatus for sensing differential pressures as defined in claim 15 wherein said means for preventing comprises a break away mechanism.

17. An apparatus for sensing differential pressures comprising:
a housing having an inner chamber filled with a substantially incompressible working fluid;
a first diaphragm in said housing for separating a fluid having a first pressure from said inner chamber;
a second diaphragm in said housing for separating a fluid having a second pressure from said inner chamber, the difference between said first and second pressures creating a differential pressure;
a core mounted within a cylindrical tube positioned within said chamber having a first end anchored to said housing, a second end coupled to said first diaphragm, and a relatively flexible intermediate section which flexes in response to said differential pressure; and
a strain sensor mounted on said core adjacent said flexible intermediate section for sensing forces applied to said core by said first diaphragm.

18. An apparatus for sensing differential pressures as defined in claim 17 wherein said core has a circular cross-section.

19. An apparatus for sensing differential pressures as defined in claim 18 further comprising a second strain sensor mounted on said core on a side opposite the first strain sensor.

20. An apparatus for sensing differential pressures as defined in claim 17 wherein said strain sensor comprises a tri-bar vibrating beam force sensor.

21. An apparatus for sensing differential pressures as defined in claim 17 wherein said strain sensor comprises a double ended tuning fork.

22. An apparatus for sensing a differential pressure comprising:
a housing having an inner chamber filled with a substantially incompressible working fluid;
a first diaphragm in said housing for separating a fluid having a first pressure from said inner chamber;
a second diaphragm in said housing for separating a fluid having a second pressure from said inner chamber; and
a flex-tube positioned within said inner chamber for sensing the differential pressure, said flex-tube comprising a core mounted within a cylindrical tube, said flex-tube having a first end anchored to said housing and a second end coupled to said first diaphragm, and a strain sensor mounted on said core for sensing forces applied to said flex-tube by said first diaphragm.

23. An apparatus for sensing differential pressures as defined in claim 22 wherein said core has a first end securely mounted in said housing and a second end positioned within said tube such that it is free to move in the axial direction in said tube while maintaining a constant radial position.

24. An apparatus for sensing differential pressures as defined in claim 22 wherein said core is securely mounted at both ends in said tube.

* * * * *

UNITED STATES PATENT AND TRADEMARK OFFICE
CERTIFICATE OF CORRECTION

PATENT NO. : 4,878,385

DATED : November 7, 1989

INVENTOR(S) : Sheldon G. Lloyd

It is certified that error appears in the above-identified patent and that said Letters Patent is hereby corrected as shown below:

Column 4, line 3, change "22" to --32--.

Signed and Sealed this

First Day of January, 1991

Attest:

HARRY F. MANBECK, JR.

*Attesting Officer*     *Commissioner of Patents and Trademarks*